D. C. ROWLAND.
NUT LOCK.
APPLICATION FILED AUG. 10, 1912.
1,048,347.
Patented Dec. 24, 1912.
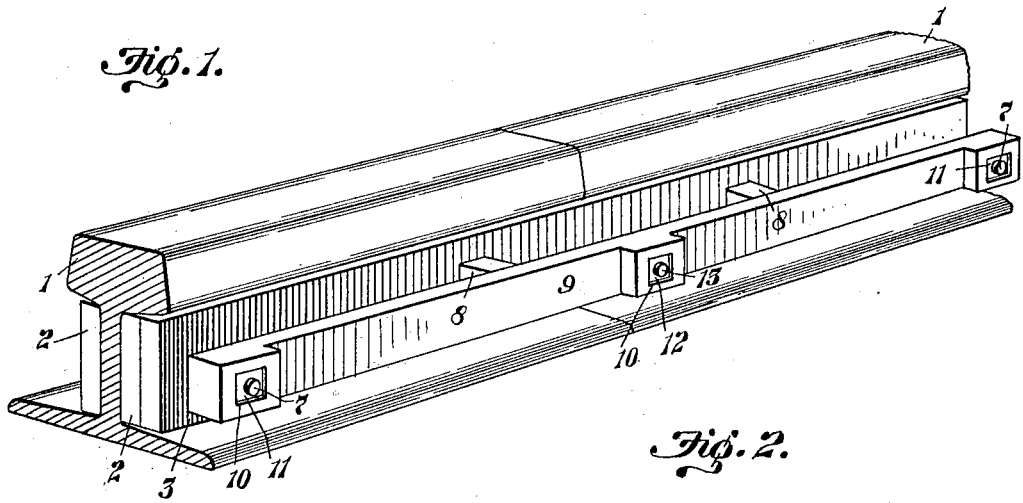
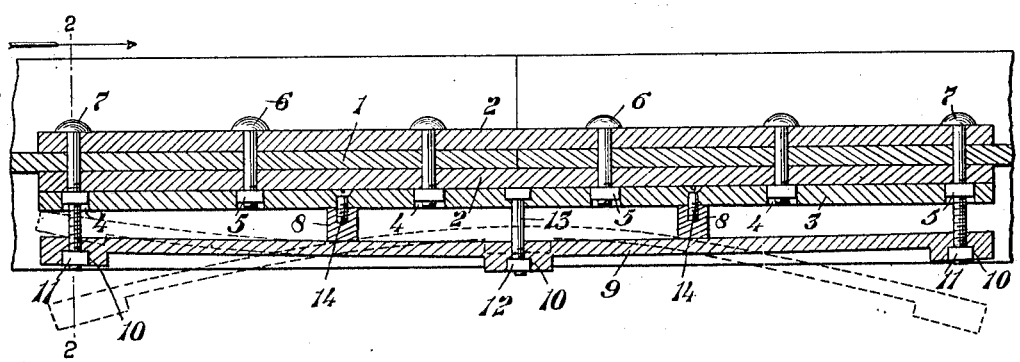
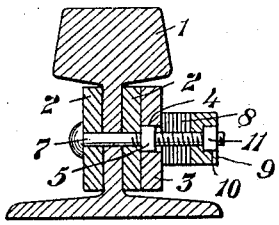
Inventor
Daniel C. Rowland.
Witnesses
J. H. Bishoff.
Sylvia Boron.
By Bond & Miller
Attorneys

UNITED STATES PATENT OFFICE.

DANIEL C. ROWLAND, OF CANTON, OHIO.

NUT-LOCK.

1,048,347.

Specification of Letters Patent.

Patented Dec. 24, 1912.

Application filed August 10, 1912. Serial No. 714,326.

*To all whom it may concern:*

Be it known that I, DANIEL C. ROWLAND, a citizen of the United States, residing at Canton, in the county of Stark and State of Ohio, have invented certain new and useful Improvements in Nut-Locks, of which the following is a specification.

My invention relates to improvements in nut locks in which a spring bar is employed in conjunction with bolts and nuts, and the objects are, first, to provide simple and efficient means for locking the nuts, second, to provide means for removing the nuts when desired, and third, to secure one of the fish plates in position independent of the nuts usually employed for such purpose. These objects together with other objects readily apparent to those skilled in the art I attain by the construction illustrated in the accompanying drawings, although my invention may be employed in a variety of other mechanical forms, the construction illustrated being chosen by way of example.

In the accompanying drawing: Figure 1 is a perspective view. Fig. 2 is a longitudinal section. Fig. 3 is a transverse section on line 2—2, Fig. 2.

Similar numerals of reference indicate corresponding parts in all the figures of the drawing.

In the accompanying drawing, 1 represents the railway rails which are of the usual construction and are joined together by the usual fish plates 2. Upon one of the fish plates is located the nut locking plate 3, which locking plate is provided with a number of angular apertures 4, which apertures are for the purpose of receiving and locking the nuts 5 upon the bolts 6 and 7. To the locking plate 3 are connected in any convenient and well known manner the short posts or extensions 8, which extensions are spaced from each other and are for the purpose of forming a rest for the spring-bar 9, which spring-bar is provided with the angular nut locking recesses 10, which recesses are for the purpose of locking the nuts 11 and 12 upon the bolts 7 and the bolt 13. The bolt 13 is connected to the locking plate 3, and is for the purpose of assisting in holding the spring-bar 9. In use the fish plates 2 are properly assembled with reference to the rails 1 and the bolts 6 and 7 together with their nuts properly arranged so as to properly clamp and join the ends of the railway rails together. The bolts 7 are formed of a length greater than the length of the bolts 6 and are so formed for the purpose of extending said bolts beyond the outer face of the locking plate. The locking plate is placed against the outer face of one of the fish plates 2, thereby locking the nuts 5, against rotating. The spring-bar 9 is placed upon the bolt 13 and the nut 12 placed upon said bolt 13 before the ends of the spring-bar are connected. After the spring-bar has been thus connected the ends of the spring-bar are bent toward the locking plate a sufficient distance to bring the ends of the bolts 7 through suitable apertures formed in said spring after which the nuts 11 are placed in position upon the bolts 7.

It will be understood that the nuts 11 should be turned a sufficient distance upon the bolts 7 to give said spring-bar a slight curvature so that the tension of the spring will cause the bar to spring outward or away from the locking plate 3, until the nuts 11 are seated in the outer or end recesses 10, thereby locking the nuts 11 against rotation. It will be understood that when the ends of the spring bar 9 are moved outward or away from the locking plate 3 as illustrated in the dotted lines Fig. 2 the middle portion of said spring-bar will be curved or bent toward the locking plate, thereby extending the outer end of the bolt 13 through the spring bar 9, at which time the nut 12 can be placed upon the bolt 13. When the spring bar 9 is bent in the opposite direction the central or middle portion of said spring bar will be bowed outward, thereby seating the nut 12 in the aperture designed to lock said nut. Should it be desired to remove the spring bar 9 for any cause the ends of said bar can be pressed toward the locking plate 3, a sufficient distance to remove the nuts 11 from the locking recess, after which said nuts can be removed. The moving of the ends of the spring bar 9 outward will move or spring the central portion of said spring bar toward the locking plate 3 at which time the nut 12 can be released, after which the spring-bar can be entirely removed.

The posts or extensions 8 may be connected to the locking plate in any convenient and well known manner. In the drawings I have illustrated ordinary screws 14 for connecting the posts 8 to the locking plate 3, but it is obvious that other means may be employed without departing from the nature of my invention.

Having fully described my invention what I claim as new and desire to secure by Letters Patent, is—

1. In a nut lock of the class described, the combination of railway rails and fish plates, a series of bolts, the outermost bolts of the series formed of greater length than the length of the intermediate bolts, a locking plate, posts connected to said locking plate and spaced from each other, a spring-bar provided with nut locking apertures and means for connecting said spring-bar to the locking plate, substantially as and for the purpose specified.

2. In a nut lock of the class described, the combination of railway rails and fish plates, a series of bolts, the outermost bolts of the series formed of greater length than the length of the intermediate bolts, a locking plate located upon one of the fish plates, a spring-bar provided with nut locking apertures and means intermediate the locking plate and spring bar adapted for abutment against the inner face of the spring bar, substantially as and for the purpose specified.

In testimony that I claim the above, I have hereunto subscribed my name in the presence of two witnesses.

DANIEL C. ROWLAND.

Witnesses:
JOHN H. BISHOP,
F. W. BOND.

Copies of this patent may be obtained for five cents each, by addressing the "Commissioner of Patents, Washington, D. C."